United States Patent
Baumgarte

(10) Patent No.: US 10,636,448 B2
(45) Date of Patent: Apr. 28, 2020

(54) AUDIO BUFFERING FOR PROCESSING WITH VARIABLE LOOKAHEAD

(71) Applicant: Apple Inc., Cupertino, CA (US)

(72) Inventor: Frank Baumgarte, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/133,433

(22) Filed: Sep. 17, 2018

(65) Prior Publication Data

US 2020/0090697 A1   Mar. 19, 2020

(51) Int. Cl.
*H04B 15/00* (2006.01)
*G11B 20/10* (2006.01)
*G06F 3/16* (2006.01)
*G11B 27/038* (2006.01)

(52) U.S. Cl.
CPC ........ *G11B 20/10046* (2013.01); *G06F 3/165* (2013.01); *G11B 20/10527* (2013.01); *G11B 27/038* (2013.01); *G11B 2020/10712* (2013.01)

(58) Field of Classification Search
CPC ........ G11B 2020/10712; G11B 27/038; G11B 20/10527; G11B 20/10046; G06F 3/165
USPC ................ 381/92.4, 92.8, 118–120
See application file for complete search history.

(56) References Cited

U.S. PATENT DOCUMENTS

| | | |
|---|---|---|
| 9,608,588 B2 | 3/2017 | Baumgarte |
| 2015/0207479 A1* | 7/2015 | Baumgarte ............ H03G 9/025 704/211 |

OTHER PUBLICATIONS

Digital Dynamic Range Compressor Design—A Tutorial and Analysis, by D Giannoulis, M Massberg, JD Reiss; Journal of the Audio Engineering, Soc., vol. 60, No. 6, Jun. 2012; pp. 399-408.
Requirements for Loudness and True-peak Indicating Meters; BS Series. Broadcasting service (sound); BS.1771-1 Jan. 2012; 14 Pages.

* cited by examiner

*Primary Examiner* — Ammar T Hamid
(74) *Attorney, Agent, or Firm* — Womble Bond Dickinson (US) LLP

(57) ABSTRACT

An audio processing system has a buffer, a first digital signal processing module that uses a first lookahead, a second digital signal processing module that uses a second, greater lookahead, and a cross-fader. The cross-fader fades between the output of the first digital signal processing module to the output of the second digital signal processing module, based on lookahead depth of data of the audio signal in the buffer. Other aspects are also described and claimed.

21 Claims, 3 Drawing Sheets

AUDIO BUFFERING FOR PROCESSING WITH VARIABLE LOOKAHEAD

An aspect of the disclosure here relates to audio signal processing with lookahead. Other aspects are also described.

BACKGROUND

In audio playback systems, various signal processing can be applied to improve the user experience. For example, dynamic range compression (DRC) can be applied to an audio signal when playback occurs in a noisy scenario, a peak limiter can be applied to avoid hard clipping, loudness equalization (EQ) can be applied if the playback loudness is lower than the loudness at which the content was mastered, EQ can be applied to improve the spectral balance, and automatic gain control (AGC) can be applied to achieve consistent loudness in a similar way as loudness normalization. Most of these signal processing algorithms include some kind of audio signal analysis or measurement, which is used to adapt parameters of the algorithm. For instance, the DRC, loudness EQ, and automatic gain control are commonly based on a short-term level or loudness estimate of the audio signal, to control the gain that is applied to the audio signal by the algorithm.

SUMMARY

An audio playback system and related method of audio processing use different amounts of lookahead for digital signal processing of an audio signal. A cross-fader fades from output of one digital signal processing module to the other digital signal processing module, based on lookahead depth in a buffer.

Such an audio playback system can include a buffer, a first digital signal processing module, a second digital signal processing module, and a cross-fader. The buffer receives the audio signal. The first digital signal processing module processes the audio signal from the buffer, using a first amount of lookahead. The second digital signal processing module processes the audio signal from the buffer using a second, greater lookahead. The cross-fader outputs a processed audio signal based on output of the first digital signal processing module or output of the second digital signal processing module. The cross-fader fades the processed audio signal from the output of the first digital signal processing module to the output of the second digital signal processing module. Or, the cross-fader fades the processed audio signal from the output of the second digital signal processing module to the output of the first digital signal processing module. The cross-fader fades the audio signal based on the available lookahead depth of data of the audio signal in the buffer.

A method of processing audio for playback can be performed by an audio playback system, as follows. An audio signal is received into a buffer. The audio signal from the buffer is processed in a first digital signal processing module using a first amount of lookahead. The method includes processing the audio signal from the buffer in a second digital signal processing module, using a second greater amount of lookahead. The method includes cross-fading a processed audio signal from output of the first digital signal processing module to output of the second digital signal processing module, or cross-fading from the output of the second digital signal processing module to the output of the first digital signal processing module. The cross-fading depends on available lookahead depth of data of the audio signal in the buffer.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Figure 1:
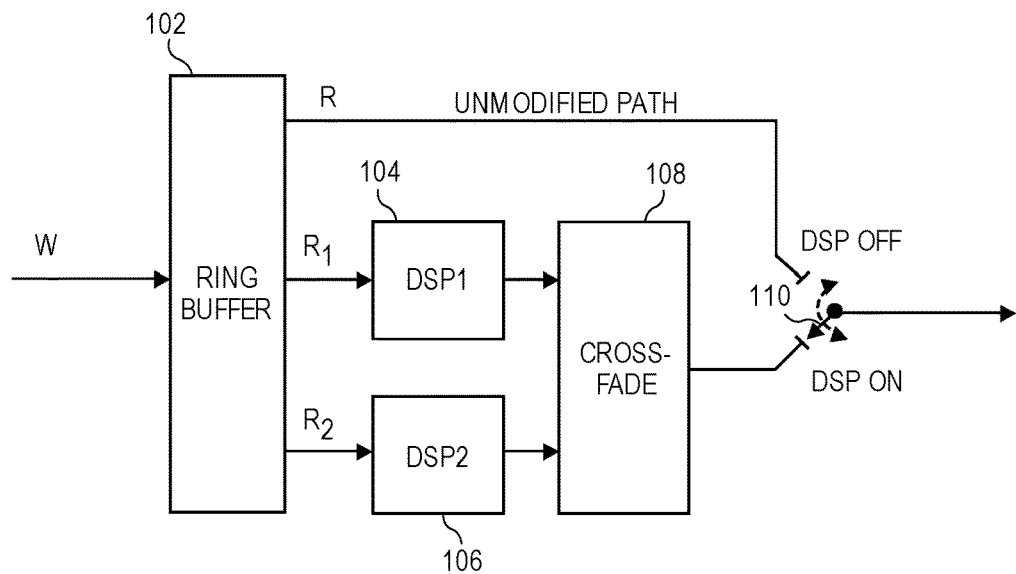
FIG. 1 depicts an audio processing system that cross-fades between signal processing with a smaller lookahead and signal processing with a larger lookahead, for improved listener experience.

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

Audio processing systems with dynamic range compression, peak limiting, loudness equalization, spectral balancing, automatic gain control and other forms of digital signal processing typically use a short-term level or loudness estimate of an input audio signal, to control the gain that is applied to the audio signal by an algorithm. In most cases, the perceived quality that can be achieved by the algorithm depends on the permitted lookahead during which the audio signal is analyzed (e.g., to compute its short-term level or loudness estimate), before it is sent to the output of the algorithm. The playback quality may drop significantly, when the lookahead is reduced. Lookahead may be defined as the time difference between the input and output signal of a module. If an observer has only access to the output signal, this signal can be interpreted as the real-time signal and the input signal is ahead in time by the lookahead value.

In many playback system designs, the lookahead permitted for signal processing can directly affect the playback latency and responsiveness that the listener experiences. The latency may become noticeable as a playback delay, a form of sluggishness when skipping forward/backwards, or a delay for other user settings. To avoid this kind of degraded user experience, the lookahead is usually limited and a reasonable tradeoff has to be found for the lookahead to be not too small, so that the signal processing quality is sufficient while still supporting a low enough latency to avoid sluggishness and degraded responsiveness.

In certain file-based playback scenarios such as local file playback or file-based streaming, it is possible to permit a larger lookahead without affecting the perceived system sluggishness or responsiveness. An audio processing system described herein, with various aspects and variations, can perform digital signal processing upon an input audio signal, with both shorter and larger lookahead, cross-fading between the two depending on data depth in an audio buffer that is receiving the input audio signal. The system can begin playback, skip ahead or skip back, or switch to another audio source (e.g., another song), using the shorter lookahead, for low playback latency. It can then cross-fade to performing its digital signal processing using the larger lookahead, for higher quality signal analysis and the resulting higher quality control of gain changes.

In one instance, a traditional system that has a traditional signal processing module with a small fixed lookahead can be enhanced by the addition of a local input buffer which is filled faster than the playback rate whenever possible until the buffer is full. Once the buffer level reaches a certain fullness threshold, an alternative signal processing module is enabled that has a larger lookahead than the traditional one. The larger lookahead is provided by the buffer content and adjusted such that the output of the alternative signal processing is synchronized in time with the output of the traditional signal processing module. Once the alternative signal-processing module starts producing valid output (e.g., with the buffer level at the fullness threshold and enough samples of the audio signal have propagated through all taps of the digital filters in the signal-processing module), the output audio signal cross-fades from the traditional signal processing module output (with the shorter lookahead) over to the alternative one with the longer lookahead. The increased lookahead is transparent to the user, since it is compensated for by the temporarily faster than real-time audio input from the file or stream.

Whenever the user skips or switches content, the playback system will respond and switch back to the traditional signal processing module (with the shorter lookahead) until the buffer is full enough to cross-fade again to the alternative signal processing module (with the larger lookahead.)

In some scenarios, the buffer can additionally be used to bridge temporary drops in data rates (the rate at which the input audio signal is arriving), for instance when the input audio signal is arriving into a playback device over a wireless connection or when a processor in the playback device that is decoding the audio signal is overloaded. In that case, the buffer fullness level may drop below the threshold T2 that is necessary to maintain the larger lookahead. In such a case, the signal processing that is being performed on the input audio signal is cross-faded back to the traditional signal processing module that has the small lookahead (threshold T1). To avoid frequent cross-fading in some versions, it is advantageous to apply hysteresis to the switching between the traditional and alternative signal processing algorithms.

In some systems, a buffer may already exist to bridge temporary drops in data rate and this buffer may be used to support the process described above for increased lookahead signal processing.

More generally, there may be more than two variants of the signal processing algorithms, each with different lookahead. The method described above can be extended to accommodate more than two different lookahead in a straight-forward manner.

FIG. 1 depicts an audio processing system that cross-fades between signal processing with a smaller lookahead and signal processing with a larger lookahead, for improved listener experience. Two digital signal processing (DSP) modules 104, 106 are coupled to a ring buffer 102, although other types of buffers could be used in variations. A cross-fader 108 is coupled to outputs of the digital signal processing modules 104, 106. As depicted in FIG. 1, in some versions a switch 110 selects between an output of the ring buffer 102 with digital signal processing off, and an output of the cross-fader 108, with digital signal processing on.

To operate the audio processing system, an audio signal (e.g., a left or right channel output of a stereo mix) is received by the ring buffer 102 and written to memory locations pointed to by the write pointer W, as further described below with reference to FIG. 2. A read pointer R to the ring buffer 102 is available for reading the audio signal with digital signal processing off, e.g., through the switch 110.

Figure 2:
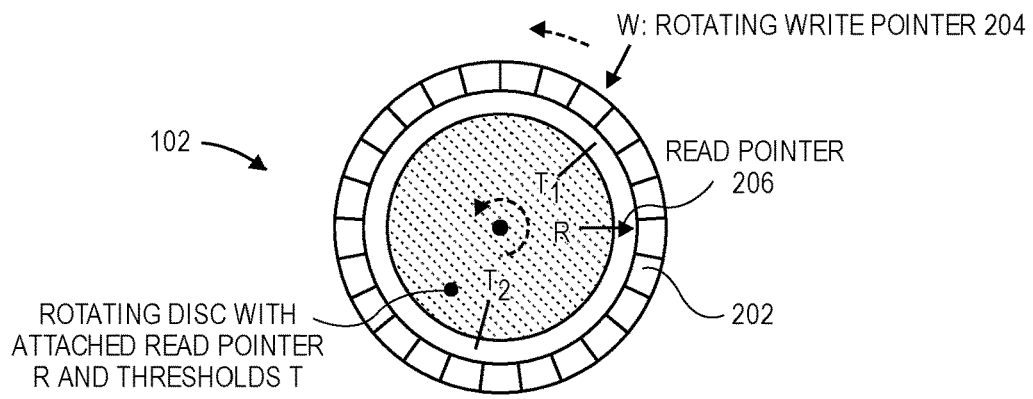
FIG. 2 depicts a ring buffer that is suitable for the audio processing system of FIG. 1.

A read pointer R1 for the first digital signal processing module 104 DSP1 is available for signal processing of the audio signal from the buffer 102 in DSP1, and the output of DSP1 may be deemed to be reliable so long as W is ahead of R beyond T1 (as seen in FIG. 2.) The difference between T1 and R may be referred to here as the (shorter) lookahead. Similarly, a read pointer R2 for the second digital signal processing module 106 DSP2 is available for signal processing of the audio signal from the buffer 102 in DSP2, and the output of DSP2 may be deemed to be reliable so long as W is ahead of R beyond T2. Note that this situation is not met in FIG. 2 since W is not ahead of T2. The difference between T2 and R is also referred to here as the greater or longer lookahead. A lookahead may also be defined as the initial delay or time interval needed by a given DSP module to process the input audio signal until its output audio signal is valid. The reason R1 and R2 are located in different places is because the lookahead is different. Note that the inputs of the crossfader must be time aligned and that DSP1 and DSP2 have different delays. R1 and R2 inherently compensate for the different delays. Furthermore, the unmodified path is also time aligned with the crossfader output.

The cross-fader 108 outputs a processed audio signal based on the output of the first digital signal processing module 104 or the output of the second digital signal processing module 106, as shown. In the example shown in FIG. 1, the cross-fader 108 fades the processed audio signal from the output of the first digital signal processing module 104 to the output of the second digital signal processing module 106 when the lookahead depth of data of the audio signal in the buffer 102 supports the greater lookahead. Or, the cross-fader 108 fades the processed audio signal from the output of the second digital signal processing module 106 to the output of the first digital signal processing module 104, when the lookahead depth of data of the audio signal in the buffer 102 no longer supports the greater lookahead.

Cross-fading is thus based on lookahead depth of data of the audio signal in the buffer 102. It may be considered that the lookahead for DSP1 is T1-R, and for DSP2 it is T2-R, while the pointer R is used for the "no lookahead" path.

FIG. 2 depicts a ring buffer 102 that is suitable for the audio processing system of FIG. 1. While computer memory is usually addressed in a linear way, a virtual ring buffer is usually implemented by allocating a block of linearly addressed memory 202 and by using one or more read pointers 206 and a write pointer 204, which wrap around once they reach the end of the linear buffer. With the wraparound, the buffer acts like a ring buffer 102, where buffered data is overwritten with new data once the write pointer 204 is beyond one full rotation (or after the wraparound).

In this depiction of the ring buffer 102, the ring buffer 102 is shown as a large ring and it is accessed by a write pointer 204 W and a reference read pointer 206 R. At startup, W and R point to the same memory location in the ring buffer 102. The (virtual) disc with the read pointer rotates at constant speed, where the speed is determined by the playback sample rate of, for example, pulse code modulation (PCM) audio output. Other types of audio signals and/or coding may be readily used, including sub-band signals and transform-domain signals. The audio output (reading) starts, when the rotating W (which is "ahead" of R) reaches $T_1$ and then the virtual disc starts rotating. The write pointer 204 must maintain a position ahead of the $T_1$ position (as the virtual discs is rotating) to avoid audible glitches. The read pointer 206 R provides the reference read position which corresponds to the unmodified audio signal with a delay of $T_1$. In some versions, the lookahead depth of data of the audio signal in the buffer 102 is the amount of data ahead of the read pointer 206, towards a position at or behind the write pointer 204 (in the counter clockwise direction shown.)

With reference to FIGS. 1 and 2, the two digital signal processing modules 104, 106 are connected to the ring buffer 102 to provide processed versions of the audio signal from the buffer 102, and there is also a direct or unmodified output that is available from the ring buffer 102 without any processing, through the read pointer 206 R and the switch 110 in the DSP off position. A typical legacy system would have just one processing module 104 (module DSP1) that uses a lookahead of $(T_1-R)$ relative to the unprocessed output so that both are in phase. In the enhanced system of FIG. 1, a second digital signal processing module 106 DSP2 is added that uses a lookahead of $(T_2-R)$ relative to the unprocessed output, which produces time-synchronized output with DSP1 if sufficient lookahead depth of data is available in the buffer.

In the following, an implementation of the ring buffer 102 with linearly addressed memory is explained. The buffer 102 has a size of B audio samples for a single audio channel. The buffer address range is from 0 to B−1. As time progresses, the audio signal is written and read by the pointers 204, 206 and the pointer is incremented by one after each access except for the wraparound. Mathematically, the wraparound can be described by modulo arithmetic, which can be formulated in a simplified form using the following definitions for the pointer arithmetic of two pointers x and y.

Range of x and y:

$x \in [0, B-1]$ $y \in [0, B-1]$

Sum of x and y modulo buffer size B:

$$x \oplus y := \begin{cases} x+y; & \text{if } x+y < B \\ x+y-B; & \text{else} \end{cases}$$

Difference of x and y modulo buffer size B:

$$x \ominus y := \begin{cases} x-y; & \text{if } x-y \geq 0 \\ x-y+B; & \text{else} \end{cases}$$

With the defined arithmetic, the read pointers can be computed as follows. For the read pointer of module 1:

$$R_1 = \begin{cases} W & \text{if } W \ominus R < T_1 \\ R \oplus T_1 & \text{else} \end{cases}$$

Whenever $R_1 \equiv R \oplus T_1$, with the write pointer 204 ahead of the read pointer of the first digital signal processing module 104 DSP1 and sufficient depth of the data of the auto signal in the buffer 102 to satisfy the first, shorter lookahead, digital signal processing module 104 DSP1 delivers valid output. $W \ominus R$ should never be smaller than $T_1$ after the startup phase.

For the read pointer of module 2:

$$R_2 = \begin{cases} W & \text{if } W \ominus R < T_2 \\ R \oplus T_2 & \text{else} \end{cases}$$

Whenever $R_2 \equiv R \oplus T_2$, with the write pointer 204 ahead of the read pointer of the second digital signal processing module 106 DSP2 and sufficient depth of the data of the auto signal in the buffer 102 to satisfy the second, larger or longer lookahead, digital signal processing module 106 DSP2 delivers valid output that is synchronous to the playback signal.

In systems that can always maintain a writing data rate of at least real-time, the output is cross-faded by the cross-fader 108 from the DSP1 output to the DSP2 output once $R_2 \equiv R \oplus T_2$.

Figure 3:
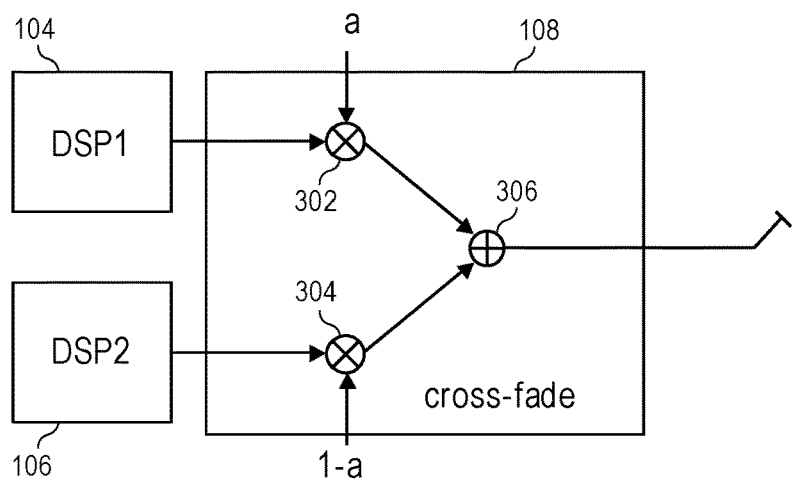
FIG. 3 depicts a cross-fader that is suitable for the audio processing system of FIG. 1.

FIG. 3 depicts a cross-fader 108 that is suitable for the audio processing system of FIG. 1. A cross-fade can be achieved as shown in FIG. 3 by applying complementing weighting factors to the outputs of both digital signal processing modules 104, 106 before they are added. The parameter has values that gradually decrease from 1.0 to 0.0 over time, for cross-fading from the first digital signal processing module 104 to the second digital signal processing module 106, and increase from 0.0 to 1.0 over time, for cross-fading from the second digital signal processing module 106 to the first digital signal processing module 104. When a 0, only the output of digital signal processing module 106 DSP2 is passed to the output and digital signal processing module 104 DSP1 does not contribute. This state is maintained until the end of the input audio signal is reached (when writing stops), so long as the lookahead depth of data of the audio signal is sufficient in the buffer 102 to maintain the lookahead for the digital signal processing in the second digital signal processing module 106. From then on, digital signal processing module 106 DSP2 should process the remaining audio signal portion for output so that it can be flushed out to complete the audio output of the system.

In systems where it is uncertain if a real-time input rate can be maintained, additional provisions are made to support a cross-fade (by the cross-fader 108) back to digital signal processing module 104 DSP1 with the lower lookahead. Furthermore, the ring buffer 102 size should be larger in some versions so that it can accommodate rate fluctuations. The additional buffer size should hold at least enough audio signal to support the complete duration of a cross-fade. In addition, there should be room to accommodate the rate fluctuations.

For such a system, a cross-fade duration is defined as $T_x$. After startup, the system will cross-fade by the cross-fader 108 to digital signal processing module 106 DSP2 when the write pointer 204 fulfills $W \equiv R \oplus T_2 \oplus T_x$. That ensures that when a sudden write rate drop occurs, the system can still cross-fade back to digital signal processing module 104 DSP1. Such a reverse cross-fade is initiated when $W \equiv R \oplus T_2 \oplus (T_x - 1)$.

In order to avoid too much oscillation between digital signal processing module 104 DSP1 and digital signal processing module 106 DSP2, the buffer 102 size B can be increased and/or hysteresis can be applied when cross-fading (by the cross-fader 108) to digital signal processing module 106 DSP2. The hysteresis can be implemented in various ways, for instance by using a time delay before permitting a cross-fade to module 2 or by requiring that W is larger before the cross-fading is initiated:

$$W \equiv R \oplus T_2 \oplus T_x \oplus T_+.$$

$T_+$ must be supported by the buffer size. Further ways hysteresis can be implemented are by selecting various upper and lower thresholds for depth of data of the audio signal in the ring buffer 102, monitoring the rate of filling or rate of emptying of the depth of the data of the audio signal in the ring buffer 102 and comparing to threshold(s), and so on as readily devised in keeping with the teachings herein. In some versions, hysteresis functions can be implemented to decrease frequency of cross-fading when the lookahead depth of the data of the audio signal and the buffer is low, for example relative to the shorter or longer lookahead.

The buffering scheme described above can easily be enhanced from one to multiple audio channels, interleaved or separate.

The support for asynchronous writing of the ring buffer 102 can help to smooth transmission rate fluctuations that can be caused for instance by wireless channels, or CPU load. To control the write data rate, the buffer 102 can keep requesting more data until it is full. It should be signaled to the system, when the end of the audio input signal is reached, so that the modules can be flushed.

Figure 4:
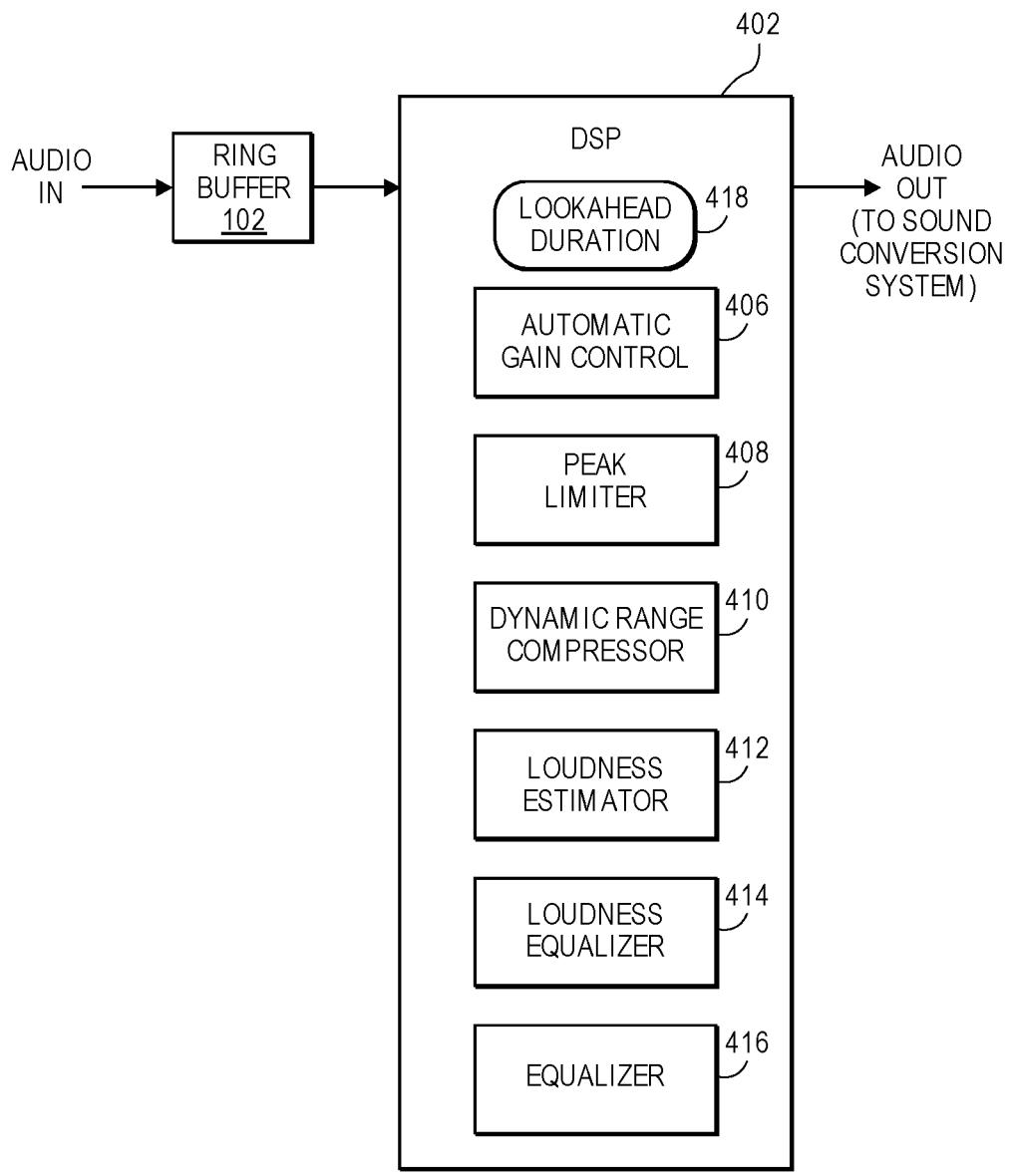
FIG. 4 depicts a digital signal processor with various signal processing modules, for the audio processing system of FIG. 1.

FIG. 4 depicts an example digital signal processing module 402 (e.g., digital signal processing module 104 DSP1 or digital signal processing module 106 DSP2 in FIG. 1) that can perform various signal processing tasks upon the audio signal from the ring buffer 102, including in this example automatic again control 406 (AGC), peak limiter 408, dynamic range compressor 410, loudness estimator 412, loudness equalizer 414, and equalizer 416, for the audio processing system of FIG. 1. Each of the digital signal processing modules 104, 106 could have one or more of these tasks, or other audio processing tasks as readily devised, with the first digital signal processing module 104 using the small lookahead and the second digital signal processing module 106 using the large lookahead, as lookahead 418 in the digital signal processor 402. These modules are readily implemented in software executing on a processor, hardware, firmware, or combination thereof. Generally, both of the digital signal processing modules 104, 106 should have the same signal processing tasks therein, with each tuned for the respective lookahead 418, although it may be possible for the digital signal processing modules 104, 106 to have different tasks. The processed audio signal at the output of the DSP module 402 may be sent to a sound conversion system (not shown, e.g., a headphone amplification system, a loudspeaker amplification system.)

Automatic gain control (AGC) module 406 adjusts or sets the gain (e.g., as a multiplier) of the audio signal based on first processing the audio signal over the specified lookahead 418. Use of the larger lookahead, in the second digital signal processing module 106, has the effect of smoothing and making the gain control more accurate in comparison to using the shorter lookahead, in the first digital signal processing module 104. This helps reduce abruptness of gain change and unexpected excursions of signal amplitude.

Peak limiter module 408 clips peaks of the audio signal, or adjusts or sets the gain of the audio signal, usually over a shorter duration than automatic gain control, based on processing the audio signal over the specified lookahead. Using the larger lookahead, in the second digital signal processing module 106, has the effect of softer clipping, smoother limiting, or gentler, smoother adjustment of short-term or medium-term gain control in comparison to using the shorter lookahead, in the first digital signal processing module 104.

Dynamic range compressor module 410 adjusts gain of the audio signal to reduce the dynamic range, based on processing the audio signal over the specified lookahead. Using the larger lookahead, in the second digital signal processing module 106, has the effect of more even dynamic range compression with fewer unexpected soft or loud passages and improved handling of signal excursions in comparison to using the shorter lookahead, in the first digital signal processing module 104.

Loudness estimator module 412 estimates loudness of the audio signal, for example performing an average over time, using the specified lookahead. Loudness estimation can be used for further audio processing by other signal processing modules, and is smoother with less variations over time, or more even, with the larger lookahead used in the second digital signal processing module 106 in comparison to using the shorter lookahead, in the first digital signal processing module 104. For example, the smaller lookahead is useful for detecting and estimating momentary loudness, and the larger lookahead is useful for detecting short-term loudness over a longer duration than the momentary loudness.

Loudness equalizer module 414 performs frequency-based equalization of the audio signal, adjusted by the loudness of the audio signal. For example, a larger amplitude or louder audio signal could receive no emphasis, and the lower amplitude or quieter audio signal could receive emphasis of bass and treble frequency ranges, also known as loudness compensation. Smoother loudness equalization over time is obtained using the longer lookahead in the second digital signal processing module 106 in comparison to using the shorter lookahead in the first digital signal processing module 104. Similar techniques apply for the sound pressure level (SPL) estimation as for dynamic range compression, in some versions.

Equalizer module 416 performs other frequency-based equalization of the audio signal. The spectral balance can be better estimated with a larger lookahead.

Figure 5:
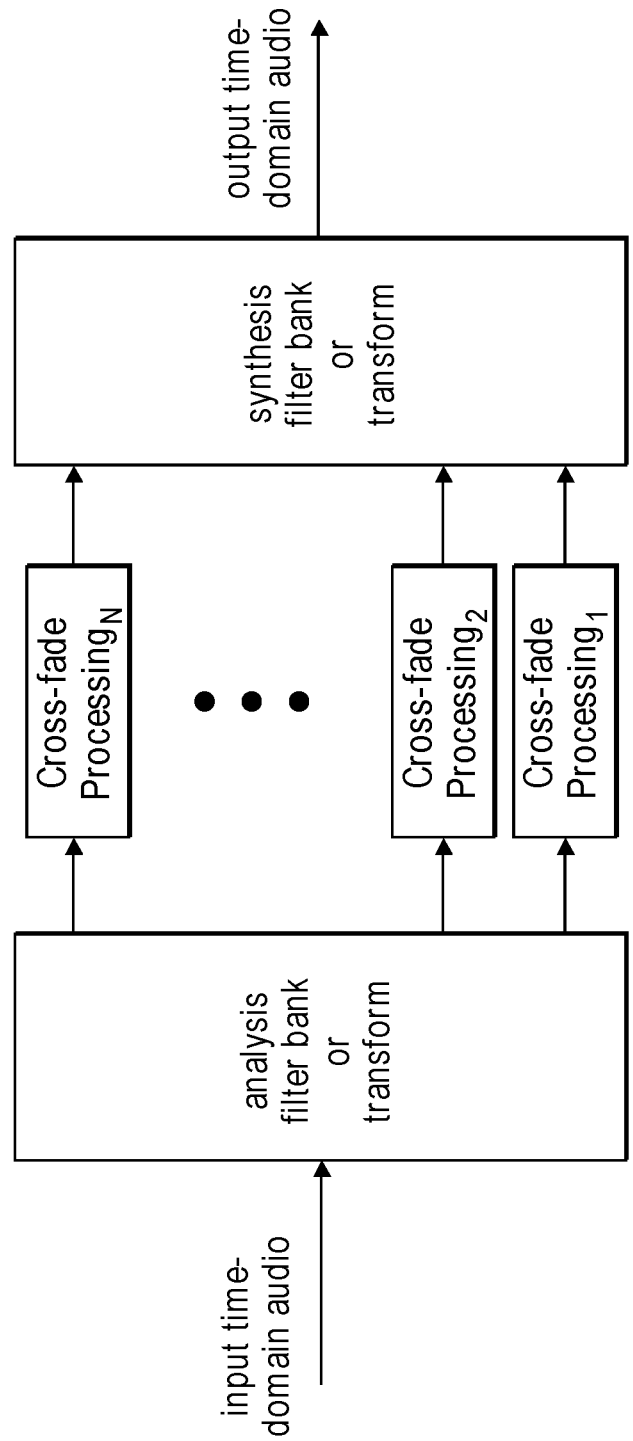
FIG. 5 illustrates how cross-fade processing of FIG. 1 may be performed upon sub-band or transform-domain signals.

The approaches described above for cross-fading, and in particular the system shown in FIG. 1, may be applied to sub-band or transform-domain signals, as for example shown in FIG. 5. Here, an analysis filter bank or transform (e.g., a quadrature mirror filter, QMF, filter bank) converts an input audio signal from time-domain format into sub-band or transform-domain format, which results in N sub-band signals. Each of these N sub-band signals is fed to a respective one of the cross-fade processing blocks 1, 2, ... N. Each cross-fade processing block may contain all of the elements shown in FIG. 1, but now operating upon one of the N sub-band signals (instead of the original time-domain signal.) The N output cross-faded signals may then be converted into an output time domain cross-faded signal, using for example a matching synthesis filter bank or inverse transform.

While certain aspects have been described and shown in the accompanying drawings, it is to be understood that such are merely illustrative of and not restrictive on the broad invention, and that the invention is not limited to the specific constructions and arrangements shown and described, since various other modifications may occur to those of ordinary skill in the art. For example, while FIG. 1 depicts a device in which a ring buffer and two digital signal processing modules are used, it is also possible to have other types of buffers, and more digital signal processing modules. The description is thus to be regarded as illustrative instead of limiting.

What is claimed is:

1. An audio playback system, comprising:
a buffer, to receive an audio signal;
a first digital signal processing module to process the audio signal from the buffer using a first lookahead;
a second digital signal processing module, to process the audio signal from the buffer using a second lookahead that is greater than the first lookahead; and
a cross-fader to output a processed audio signal one at a time based on output of the first digital signal processing module or output of the second digital signal processing module, and fade the processed audio signal, from the output of the first digital signal processing module to the output of the second digital signal processing module or from the output of the second digital signal processing module to the output of the first digital signal processing module, based on data of the audio signal in the buffer.

2. The audio playback system of claim 1, further comprising:
the cross-fader being configured to have hysteresis in the fade, to decrease frequency of cross-fading when depth of the data of the audio signal in the buffer drops below the second lookahead.

3. The audio playback system of claim 1, further comprising:
the cross-fader being configured to fade the processed audio signal from the output of the first digital signal processing module to the output of the second digital signal processing module based on a determination that the depth of the data of the audio signal in the buffer exceeds a threshold amount.

4. The audio playback system of claim 1, further comprising:
the cross-fader configured to fade the processed audio signal from the output of the second digital signal processing module to the output of the first digital signal processing module based on a determination of the depth of the data of the audio signal in the buffer is less than a threshold.

5. The audio playback system of claim 1, wherein the audio signal is a first sub-band signal, the system further comprising:
an analysis filter bank or transform process configured to transform an input time domain audio signal into a plurality of sub-band signals one of which is the first sub-band signal; and
a plurality of cross-faders to output a plurality of processed sub-band signals based on the plurality of sub-band signals, respectively.

6. The audio playback system of claim 1, further comprising:
the first digital signal processing module configured to perform a first peak limiter process upon the audio signal from the buffer according to the first lookahead; and
the second digital signal processing module configured to perform a second peak limiter process upon the audio signal from the buffer according to the second lookahead.

7. The audio playback system of claim 1, further comprising:
the first digital signal processing module configured to have a first dynamic range compressor that processes the audio signal from the buffer according to the first lookahead; and
the second digital signal processing module configured to have a second dynamic range compressor that processes the audio signal from the buffer according to the second lookahead.

8. The audio playback system of claim 1, further comprising:
the first digital signal processing module configured to have a first loudness estimator that processes the audio signal from the buffer according to the first lookahead; and
the second digital signal processing module configured to have a second loudness estimator that processes the audio signal from the buffer according to the second lookahead.

9. The audio playback system of claim 1, further comprising:
the first digital signal processing module having a first loudness equalizer to process the audio signal from the buffer with frequency-based emphasis according to the first lookahead; and
the second digital signal processing module having a second loudness equalizer to process the audio signal from the buffer with frequency-based emphasis according to the second lookahead.

10. The audio playback system of claim 1, further comprising:
the first digital signal processing module having a first equalizer to spectrally balance the audio signal from the buffer according to the first lookahead; and
the second digital signal processing module having a second equalizer to spectrally balance the audio signal from the buffer according to the second lookahead.

11. A method of processing audio, performed by a processor, comprising:
receiving an audio signal into a buffer;
processing the audio signal from the buffer in a first digital signal processing module, using a first lookahead;
processing the audio signal from the buffer in a second digital signal processing module, using a second, greater lookahead; and cross-fading a processed audio signal, between output of the first digital signal processing module and output of the second digital signal processing module, depending on lookahead depth of data of the audio signal in the buffer.

12. The method of processing audio of claim 11, further comprising:
determining the lookahead depth of the data of the audio signal in the buffer is low relative to the first lookahead or the second lookahead, and in response using hysteresis in the cross-fading to decrease frequency of the cross-fading.

13. The method of processing audio of claim 11, wherein the cross-fading is from the output of the first digital signal processing module to the output of the second digital signal processing module based on the lookahead depth of the data of the audio signal in the buffer exceeding the second lookahead or a threshold.

14. The method of processing audio of claim 11, wherein the cross-fading is from the output of the second digital signal processing module to the output of the first digital signal processing module based on determining the lookahead depth of the data of the audio signal in the buffer is less than the second lookahead or a threshold.

15. The method of processing audio of claim 11, wherein:
the processing the audio signal in first digital signal processing module comprises first automatic gain control according to the first lookahead; and
the processing the audio signal in the second digital signal processing module comprises second automatic gain control according to the second lookahead.

16. The method of processing audio of claim 11, wherein:
the processing the audio signal in the first digital signal processing module comprises first peak limiting according to the first lookahead; and
the processing the audio signal in the second digital signal processing module comprises second peak limiting according to the second lookahead.

17. An audio processing system comprising
a processor and memory having stored therein instructions that when executed by the processor:
process an audio signal from a buffer using a first lookahead to produce a first processed audio signal;
process the audio signal from the buffer using a second, greater lookahead to produce a second processed audio signal; and
cross-fade a processed audio signal, between the first processed audio signal and the second processed audio signal, depending on lookahead depth of data of the audio signal in the buffer.

18. The audio processing system of claim 17 where the lookahead depth is adjusted such that the first processed audio signal is synchronized in time with the second processed audio signal.

19. The audio processing system of claim 17 wherein the processor executes instructions stored in the memory to determine the lookahead depth of the data of the audio signal in the buffer is low relative to the first lookahead or the second lookahead, and in response uses hysteresis in the cross-fading to decrease frequency of the cross-fading.

20. The audio processing system of claim 17 wherein the cross-fading is from the first processed audio signal to the second processed audio signal, responsive to determining that the lookahead depth of the data of the audio signal in the buffer exceeds the second lookahead or a threshold.

21. The audio processing system of claim 17 wherein the cross-fading is from the second processed audio signal to the first processed audio signal, responsive to determining that the lookahead depth of the data of the audio signal in the buffer is less than the second lookahead or a threshold.

* * * * *

UNITED STATES PATENT AND TRADEMARK OFFICE
CERTIFICATE OF CORRECTION

PATENT NO. : 10,636,448 B2
APPLICATION NO. : 16/133433
DATED : April 28, 2020
INVENTOR(S) : Frank Baumgarte Page 1 of 1

It is certified that error appears in the above-identified patent and that said Letters Patent is hereby corrected as shown below:

In the Claims

In Claim 3 under Column 9, Line 58, delete "the depth of the data" and insert -- depth of the data --

In Claim 4 under Column 9, Line 66, delete "the depth of the data" and insert -- depth of the data --

Signed and Sealed this
Twenty-third Day of June, 2020

Andrei Iancu
*Director of the United States Patent and Trademark Office*